US012640882B2

(12) United States Patent
Park et al.

(10) Patent No.: US 12,640,882 B2
(45) Date of Patent: May 26, 2026

(54) METHOD AND APPARATUS FOR CHANNEL STATE INFORMATION FEEDBACK IN COMMUNICATION SYSTEM

(71) Applicant: ELECTRONICS AND TELECOMMUNICATIONS RESEARCH INSTITUTE, Daejeon (KR)

(72) Inventors: Han Jun Park, Daejeon (KR); Yong Jin Kwon, Daejeon (KR); An Seok Lee, Daejeon (KR); Heesoo Lee, Daejeon (KR); Yun Joo Kim, Daejeon (KR); Hyun Seo Park, Daejeon (KR); Jung Bo Son, Daejeon (KR); Yu Ro Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 305 days.

(21) Appl. No.: 18/429,049

(22) Filed: Jan. 31, 2024

(65) Prior Publication Data

US 2024/0267183 A1      Aug. 8, 2024

(30) Foreign Application Priority Data

Feb. 2, 2023     (KR) ........................ 10-2023-0014205
May 30, 2023     (KR) ........................ 10-2023-0069238

(51) Int. Cl.
| | |
|---|---|
| *H04L 5/00* | (2006.01) |
| *H04B 7/06* | (2006.01) |
| *H04W 8/22* | (2009.01) |

(52) U.S. Cl.
CPC ......... *H04L 5/0051* (2013.01); *H04B 7/0626* (2013.01); *H04B 7/0634* (2013.01); *H04W 8/22* (2013.01)

(58) Field of Classification Search
None
See application file for complete search history.

(56) References Cited

U.S. PATENT DOCUMENTS

| | | | | |
|---|---|---|---|---|
| 2011/0096863 | A1* | 4/2011 | Lee ......................... | H04L 27/18 |
| | | | | 375/295 |
| 2018/0198548 | A1* | 7/2018 | Nammi ............... | H04L 27/2657 |

(Continued)

FOREIGN PATENT DOCUMENTS

| | | |
|---|---|---|
| CN | 111464220 B | 6/2021 |

OTHER PUBLICATIONS

3GPP TS 38.211 V17.4.0 (Dec. 2022), 3rd Generation Partnership Project; Technical Specification Group Radio Access Network; NR; Physical channels and modulation (Release 17), pp. 1-136.

(Continued)

*Primary Examiner* — Faiyazkhan Ghafoerkhan
(74) *Attorney, Agent, or Firm* — Rabin & Berdo, P.C.

(57) ABSTRACT

A method of a terminal may comprise: receiving a reference signal from a base station; generating a first latent vector based on the reference signal by using an artificial neural network, the first latent vector being common CSI for M resource regions, and M being a positive integer; generating a second latent vector based on the reference signal by using the artificial neural network, the second latent vector being per-resource region CSI for each of the M resource regions; and transmitting structured CSI including the first latent vector and the second latent vectors to the base station.

20 Claims, 10 Drawing Sheets

(56) References Cited

U.S. PATENT DOCUMENTS

| 2019/0051298 | A1* | 2/2019 | Lee | H04M 1/72403 |
|---|---|---|---|---|
| 2019/0230554 | A1* | 7/2019 | Kang | H04L 45/24 |
| 2019/0253171 | A1* | 8/2019 | Nammi | H04L 27/2657 |
| 2020/0090192 | A1* | 3/2020 | Sim | G06N 3/098 |
| 2021/0167920 | A1* | 6/2021 | Cha | H04B 7/088 |
| 2021/0203393 | A1* | 7/2021 | Chung | H04B 7/0478 |
| 2021/0226682 | A1* | 7/2021 | Park | H04L 5/005 |
| 2021/0258058 | A1* | 8/2021 | Wu | H04B 7/0417 |
| 2021/0266888 | A1* | 8/2021 | Lee | H04L 1/007 |
| 2021/0314045 | A1* | 10/2021 | Cha | H04L 5/0051 |
| 2022/0046722 | A1* | 2/2022 | Kim | H04L 5/0048 |
| 2022/0279502 | A1* | 9/2022 | Awad | H04W 4/70 |
| 2022/0345863 | A1* | 10/2022 | Mueck | H04W 56/001 |
| 2023/0097268 | A1* | 3/2023 | Rahman | H04B 7/088 |
| | | | | 370/252 |
| 2023/0131694 | A1* | 4/2023 | Saber | G06N 3/0455 |
| | | | | 370/252 |
| 2023/0246753 | A1* | 8/2023 | Marzban | H04W 72/541 |
| 2024/0098773 | A1* | 3/2024 | Soldati | H04L 1/0023 |
| 2024/0137808 | A1* | 4/2024 | Lee | H04B 7/0626 |
| 2024/0147407 | A1* | 5/2024 | Zorgui | G06N 3/088 |
| 2024/0187127 | A1* | 6/2024 | Narayanan Thangaraj | H04L 5/0055 |
| 2024/0205700 | A1* | 6/2024 | Yu | H04L 5/0062 |
| 2024/0267183 | A1* | 8/2024 | Park | H04W 8/22 |
| 2025/0016593 | A1* | 1/2025 | Narayanan THangaraj | H04L 25/0254 |
| 2025/0038816 | A1* | 1/2025 | Beluri | H03M 7/70 |
| 2025/0119196 | A1* | 4/2025 | Wu | H04B 7/063 |
| 2025/0293741 | A1* | 9/2025 | Ibrahim | H04B 17/373 |
| 2025/0378335 | A1* | 12/2025 | Namgoong | G06N 3/084 |

OTHER PUBLICATIONS

3GPP TS 38.212 V17.5.0 (Mar. 2023), 3rd Generation Partnership Project; Technical Specification Group Radio Access Network; NR; Multiplexing and channel coding (Release 17), pp. 1-203.

3GPP TS 38.213 V17.5.0 (Mar. 2023), 3rd Generation Partnership Project; Technical Specification Group Radio Access Network; NR; Physical layer procedures for control (Release 17), pp. 1-262.

3GPP TS 38.214 V17.5.0 (Mar. 2023), 3rd Generation Partnership Project; Technical Specification Group Radio Access Network; NR; Physical layer procedures for data (Release 17), pp. 1-231.

3GPP TS 38.215 V17.3.0 (Mar. 2023), 3rd Generation Partnership Project; Technical Specification Group Radio Access Network; NR; Physical layer measurements (Release 17), pp. 1-26.

Chao-Kai Wen et al., "Deep Learning for Massive MIMO CSI Feedback", arXiv:1712.08919v4 [cs.IT], pp. 1-5, Apr. 23, 2018.

Qualcomm, "New SI: Study on Artificial Intelligence (AI)/Machine Learning (ML) for NR Air Interface", 3GPP TSG RAN Meeting #94e, RP-213599, Electronic Meeting, Dec. 6-17, 2021.

Wendong Liu et al., "EVCsiNet: Eigenvector-Based CSI Feedback Under 3GPP Link-Level Channels", IEEE Wireless Communications Letters, vol. 10, No. 12, pp. 2688-2692, Dec. 9, 2021.

* cited by examiner

100 encoder decoder

METHOD AND APPARATUS FOR CHANNEL STATE INFORMATION FEEDBACK IN COMMUNICATION SYSTEM

CROSS-REFERENCE TO RELATED APPLICATIONS

This application claims priority to Korean Patent Applications No. 10-2023-0014205, filed on Feb. 2, 2023, and No. 10-2023-0069238, filed on May 30, 2023, with the Korean Intellectual Property Office (KIPO), the entire contents of which are hereby incorporated by reference.

BACKGROUND

1. Technical Field

Exemplary embodiments of the present disclosure relate to a channel state information feedback technique in a communication system, and more specifically, to a channel state information feedback technique for a communication system, in which a terminal classifies channel state information (CSI) into common CSI for a plurality of resource regions and per-resource region CSI by using artificial neural networks, and transmits the classified CSIs to a base station.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, there are active researches underway to apply Artificial Intelligence (AI) and Machine Learning (ML) technologies to mobile communications. In such researches, the 3GPP is discussing methods for compressing Channel State Information (CSI) based on AI/ML. Additionally, academia is proposing a CSI compression method using a Convolutional Neural Network (CNN)-based autoencoder, which is one of the AI/ML technologies, to compress channel information. The autoencoder may calculate an eigenvector of a channel for each subband, and then compress eigenvectors for a plurality of subbands. However, in the AI/ML-based CSI compression technique, the eigenvectors for the plurality of subbands may not be compressed into CSI feedback information, which is channel state information. Therefore, when the eigenvectors for the plurality of subbands are compressed into feature information, the feature information may have an entangled structure on a payload constituting CSI feedback. At this time, the terminal may wish to perform selective CSI feedback on a part of the feature information of the eigenvectors (e.g. information on eigenvectors for some subbands). In this case, the terminal cannot specify configuration of a CSI feedback payload for the selected features and thus cannot adaptively control the CSI feedback payload.

SUMMARY

Exemplary embodiments of the present disclosure are directed to providing a method and an apparatus for CSI feedback in a communication system, allowing a terminal to classify CSI into common CSI for a plurality of resource regions and per-resource region CSI by using artificial neural networks, and to transmit the classified CSIs to a base station.

According to a first exemplary embodiment of the present disclosure, a method of a terminal may comprise: receiving a reference signal from a base station; generating a first latent vector based on the reference signal by using an artificial neural network, the first latent vector being common channel state information (CSI) for M resource regions, and M being a positive integer; generating a second latent vector based on the reference signal by using the artificial neural network, the second latent vector being per-resource region CSI for each of the M resource regions; and transmitting structured CSI including the first latent vector and the second latent vectors to the base station.

Each of the M resource region may be at least one of a CSI-reference signal (CSI-RS) resource region, a subband, a time period, or a time and frequency resource region.

The method may further comprise, before receiving the reference signal from the base station, receiving information on a partition structure of latent vectors from the base station, wherein the structured CSI is generated based on the received information on the partition structure of latent vectors.

The information on the partition structure of latent vectors may include at least one of information on whether the latent vectors are structured, information on a number of partitions of the latent vectors, information on a size of each partition of the latent vectors, information on partition(s) of the latent vectors corresponding to the common CSI, information on partition(s) of the latent vectors corresponding to the per-resource region CSI, information on a number of feedback bits for the common CSI, information on a feedback payload size for the common CSI, information on a number of feedback bits for the per-resource region CSI, or information on a feedback payload size for the per-resource region CSI.

The method may further comprise: receiving a terminal capability inquiry signal from the base station regarding whether to support the structured CSI; and transmitting terminal capability information including information on whether to support the structured CSI to the base station.

The terminal capability information may include at least one of information on whether to support the structured CSI, information on a number of partitions of the first latent vector, information on a size of each partition of the first latent vector, information on a number of partitions of the second latent vectors, or information on a size of for each partition of the second latent vectors.

The method may further comprise transmitting location information of the M resource regions to the base station.

The method may further comprise: generating predicted per-resource region CSI for each of unobserved resource regions by applying a regression model to per-resource region CSI for each of the M resource regions; and transmitting predicted second latent vectors, which are the predicted per-resource region CSIs for the unobserved resource regions, to the base station.

According to a second exemplary embodiment of the present disclosure, a method of a base station may comprise: transmitting a reference signal to a terminal; receiving, from the terminal, structured channel state information (CSI) including a first latent vector and second latent vectors based on the reference signal; generating common CSI for resource regions by restoring the first latent vector through an artificial neural network; generating per-resource region CSI for each of the resource regions by restoring the second latent vectors through the artificial neural network; and constructing channel information for each of the resource regions using the common CSI and the per-resource region CSI.

Each of the resource region may be at least one of a CSI-reference signal (CSI-RS) resource region, a subband, a time period, or a time and frequency resource region.

The method may further comprise, before transmitting the reference signal to the terminal, transmitting information on a partition structure of latent vectors to the terminal, wherein the first latent vector and the second latent vectors are generated based on the partition structure of latent vectors.

The information on the partition structure of latent vectors may include at least one of information on whether the latent vectors are structured, information on a number of partitions of the latent vectors, information on a size of each partition of the latent vectors, information on partition(s) of the latent vectors corresponding to the common CSI, information on partition(s) of the latent vectors corresponding to the per-resource region CSI, information on a number of feedback bits for the common CSI, information on a feedback payload size for the common CSI, information on a number of feedback bits for the per-resource region CSI, or information on a feedback payload size for the per-resource region CSI.

The method may further comprise: transmitting a terminal capability inquiry signal to the terminal regarding whether to support the structured CSI; and receiving terminal capability information including information on whether to support the structured CSI from the terminal.

The terminal capability information may include at least one of information on whether to support the structured CSI, information on a number of partitions of the first latent vector, information on a size of each partition of the first latent vector, information on a number of partitions of the second latent vectors, or information on a size of for each partition of the second latent vectors.

The method may further comprise: generating predicted second latent vectors for unobserved resource regions by applying a regression function to the second latent vectors; generating predicted per-resource region CSIs for the unobserved resource regions by combining the first latent vector and the predicted second latent vectors; and generating channel information for the unobserved resource regions from the predicted per-resource region CSIs.

The method may further comprise: calculating a reconstruction loss of channel information for each of the resource regions; calculating a reconstruction loss of channel information for entire resource regions by summing reconstruction losses of channel information for the respective resource regions; and training an artificial neural network to minimize the reconstruction loss of channel information for the entire resource regions.

According to a third exemplary embodiment of the present disclosure, a terminal may comprise a processor, wherein the processor may cause the terminal to perform: receiving a reference signal from a base station; generating a first latent vector based on the reference signal by using an artificial neural network, the first latent vector being common channel state information (CSI) for M resource regions, and M being a positive integer; generating a second latent vector based on the reference signal by using the artificial neural network, the second latent vector being per-resource region CSI for each of the M resource regions; and transmitting structured CSI including the first latent vector and the second latent vectors to the base station.

Each of the M resource region may be at least one of a CSI-reference signal (CSI-RS) resource region, a subband, a time period, or a time and frequency resource region.

The processor may further cause the terminal to perform: receiving a terminal capability inquiry signal from the base station regarding whether to support the structured CSI; and transmitting terminal capability information including information on whether to support the structured CSI to the base station.

The processor may further cause the terminal to perform: generating predicted per-resource region CSI for each of unobserved resource regions by applying a regression model to per-resource region CSI for each of the M resource regions; and transmitting predicted second latent vectors, which are the predicted per-resource region CSIs for the unobserved resource regions, to the base station.

According to the present disclosure, the terminal can utilize an artificial neural network to compress common channel information for a plurality of resource regions into a first type of latent vector, and compress per-resource region channel information into a second type of latent vector. In addition, according to the present disclosure, the terminal can transmit structured CSI including the first type of latent vector and the second type of latent vectors to the base station. Accordingly, the base station can receive the structured CSI including the first type of latent vector and the second type of latent vectors from the terminal. In addition, according to the present disclosure, the base station can restore channel information for each of the resource regions using the first type of latent vector and the second type of latent vectors.

DETAILED DESCRIPTION OF THE EMBODIMENTS

Figure 1:
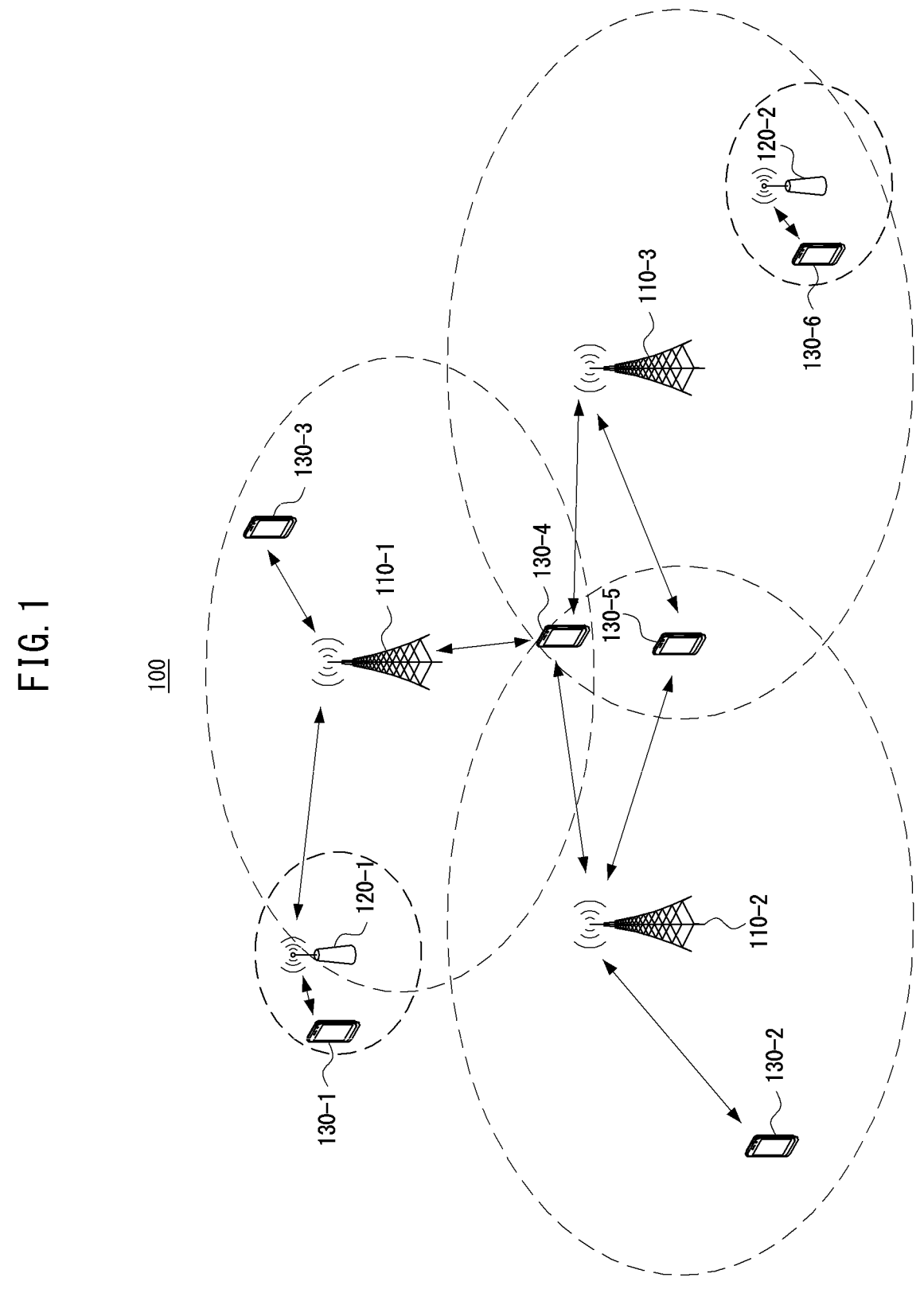
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
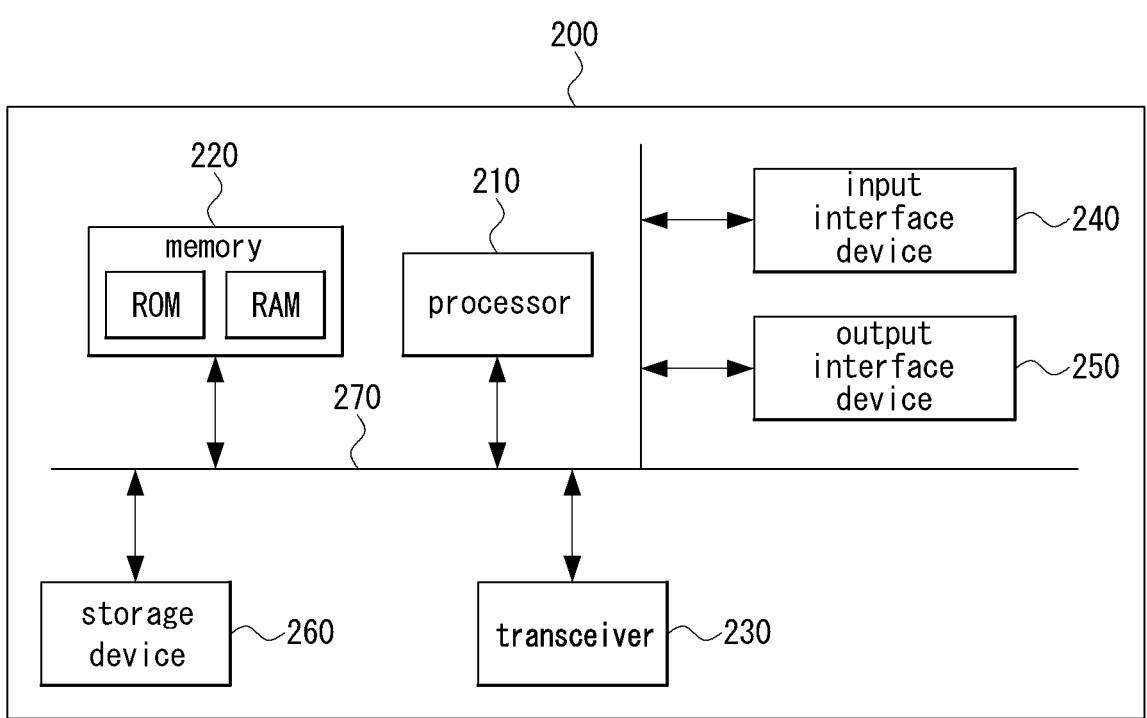
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, AI/ML techniques have recently achieved remarkable results in the fields of image and natural language processing. Aided by these advancements in the AI/ML techniques, both academic and industrial sectors are actively conducting researches to apply the AI/ML techniques to mobile communication systems. For instance, the 3rd generation partnership project (3GPP), an international standardization organization, is conducting researches to apply the AI/ML techniques to radio interfaces of mobile communication systems. In such the researches, the 3GPP considers the following three use cases as representative use cases.

(1) AI/ML-based channel state information (CSI) feedback
(2) AI/ML-based beam management
(3) AI/ML-based positioning In the AI/ML-based CSI feedback use case, the 3GPP is discussing AI/ML-based CSI compression methods for compressing channel information and AI/ML-based CSI prediction methods for predicting future channel information. Furthermore, in the AI/ML-based beam management use case, the 3GPP is discussing AI/ML-based beam prediction methods for predicting information on beams in the time/space domain. In addition, in the AI/ML-based positioning use case, the 3GPP is discussing AI/ML-based methods for directly estimating a position of a terminal, as well as methods for assisting traditional positioning techniques based on AI/ML.

Meanwhile, the academic sector is conducting researches in the direction of applying AI/ML techniques across the entire spectrum of mobile communications, including the above-described representative use cases. Specifically, the academic sector has proposed CSI compression methods utilizing convolutional neural network (CNN)-based autoencoders, a type of AI/ML technique, in relation to the AI/ML-based CSI feedback use case. The autoencoder technique implies a neural network structure that copies input to output. The autoencoder may be configured with a smaller number of neurons in a hidden layer between an encoder and a decoder than an input layer, enabling data compression (or dimensionality reduction). In the AI/ML-based CSI compression technique, artificial neural networks can be trained to compress channel information into CSI, so that the CSI corresponds to latent variables (or codes) in a latent space. However, in the AI/ML-based CSI compression technique, the CSI compressed into the latent space cannot be explained and cannot be controlled.

For example, in the AI/ML-based CSI compression technique, the autoencoder may calculate an eigenvector of a channel for each subband, and then compress eigenvectors for a plurality of subbands. However, in the AI/ML-based CSI compression technique, the eigenvectors for the plurality of subbands may not be compressed into CSI feedback information, which is channel state information. Therefore, when the eigenvectors for the plurality of subbands are compressed into feature information, the feature information may have an entangled structure on a payload constituting CSI feedback. At this time, the terminal may wish to perform selective CSI feedback on a part of the feature information of the eigenvectors (e.g. information on eigenvectors for some subbands). In this case, the terminal cannot specify configuration of a CSI feedback payload for the selected features and thus cannot adaptively control the CSI feedback payload.

To solve the above-described problem, for a case where the base station and/or terminal in a mobile communication system compresses channel information for a plurality of time and/or frequency resource regions into CSI using artificial neural networks, the present disclosure provides a method and an apparatus for feeding back the CSI by classifying and compressing the CSI into common CSI for a plurality of resource regions and per-resource region CSI.

For convenience of description below, a method for training and configuring artificial neural networks, which is proposed in the present disclosure, will be mainly described from a downlink perspective of a wireless mobile communication system consisting of a base station and a terminal. However, the proposed method of the present disclosure may be extended and applied to any wireless mobile communication system consisting of a transmitter and a receiver. Hereinafter, CSI may refer to a form of channel information compressed into an arbitrary form.

The present disclosure provides a method of configuring artificial neural network-based encoder and decoder to obtain CSI in a mobile communication system consisting of a base station and one or more terminals. Here, the encoder may receive channel information for M resource regions as input and compress them into latent vectors. In addition, the decoder may receive a portion or all of the latent vectors as input, and reconstruct channel information for each resource region of N resource regions. Here, M and N may be positive integers. Here, the M resource regions and N resource regions may be the same resource regions. That is, M and N may be the same. Alternatively, the M resource regions and N resource regions may be distinct resource regions. That is, M and N may not be the same. In case of distinct resource regions, for example, the M resource regions may be resource regions corresponding to a past time point, and the N resource regions distinct from the M resource regions may be resource regions corresponding to a future time point. Here, a (lower) artificial neural network of the decoder that reconstructs per-resource region channel information may have different weights for the respective resource regions. Alternatively, the (lower) artificial neural network of the decoder that reconstructs per-resource region channel information may have the same weights for a plurality of resource regions. The decoder may additionally use information on an order of the resource regions for which channel information needs to be reconstructed in addition to the latent vectors. Here, the lower artificial neural network of the decoder may be a sub-decoder.

Figure 3:
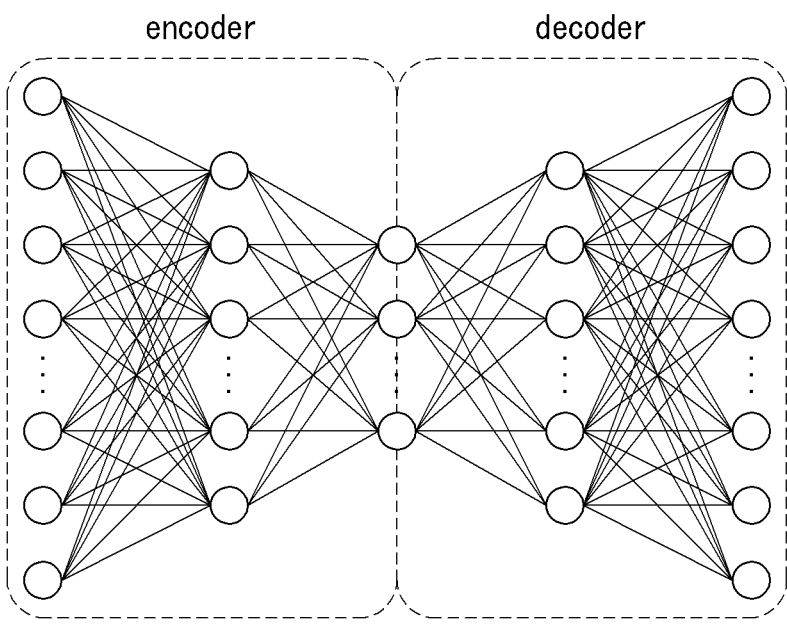
FIG. 3 is a conceptual diagram illustrating a first exemplary embodiment of a channel state information feedback method in a communication system.

FIG. 3 is a conceptual diagram illustrating a first exemplary embodiment of a channel state information feedback method in a communication system.

Referring to FIG. 3, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions.

As described above, the CSI feedback device may include the encoder and decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

In the conventional autoencoder scheme, the encoder may compress a plurality of channel information into a latent vector and deliver the latent vector to the base station as CSI. In addition, the decoder may restore the plurality of channel information by using the entire latent vectors delivered as CSI as input. Here, the latent vector is an entangled expression scheme of channel information for a plurality of resource regions, so it may be difficult to specify CSI for each resource region.

Therefore, in the present disclosure, some elements of the latent vector may mean channel information for each resource region. To this end, the communication system may restrict the input and output of the encoder and decoder when configuring the artificial neural network-based encoder and decoder for obtaining CSI. Specifically, the encoder may receive channel information for M resource regions as input, and compress them into latent vectors. In addition, the decoder may receive a portion or all of the latent vectors as input, and reconstruct per resource-region channel information for N resource regions.

An artificial neural network of the decoder (i.e. sub-block of the decoder) that reconstructs per-resource region channel information may have different weights for the respective resource regions. Alternatively, the artificial neural network of the decoder may have equal weights for a plurality of resource regions. Further, the artificial neural network of the decoder may receive information on an order of the resource regions for which channel information is to be reconstructed as additional input as well as the latent vectors. The artificial neural network-based encoder and decoder according to the present disclosure can be successfully trained.

In this case, some elements of the latent vector(s) selected as input to the decoder may be intensively trained as pre-resource region channel information to be restored. When training the encoder and decoder, the decoder may be trained by using distinct partitions of the latent vectors as input, so that per-resource region channel information is reconstructed by each partition. In this case, each partition of the latent vectors may be trained as per-resource region CSI. As a result, structured CSI, from which a channel state for each resource region can be identified, may be secured.

The present disclosure proposes a method of configuring artificial neural network-based encoder and decoder to obtain CSI in a mobile communication system consisting of a base station and one or more terminals. Here, the encoder may receive channel information for M resource regions as input and compress them into latent vectors. In addition, the decoder may configure an artificial neural network that receives a portion or all of the latent vectors as input and reconstructs per-resource region channel information for N resource regions.

The latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be defined as n=1, 2, . . . , or N. N may be a positive integer.

The M resource regions and N resource regions may be the same resource regions. That is, M and N may be the same. Alternatively, the M resource regions and N resource regions may be distinct resource regions. That is, M and N may not be the same. In case of distinct resource regions, for example, the M resource regions may be resource regions corresponding to a past time point, and the N resource regions distinct from the M resource regions may be resource regions corresponding to a future time point. Here, a (lower) artificial neural network of the decoder that reconstructs per-resource region channel information may have different weights for the respective resource regions or may have the same weights for a plurality of resource regions. Here, the lower artificial neural network of the decoder may be a sub-decoder.

Such the decoder may receive, in addition to the latent vectors, information on an order of the resource regions for which channel information needs to be reconstructed as additional input. The type 1 latent vector may be interpreted as common CSI for all N resource regions. The n-th type 2 latent vector may be interpreted as CSI for the n-th resource region. Using the encoder, the terminal may report CSI classified into the type 1 latent vector and the type 2 latent vectors to the base station (or network). Here, the type 1 latent vector may be common CSI, and the type 2 latent vector may be CSI for each resource region (i.e. per-resource region CSI).

Figure 4:
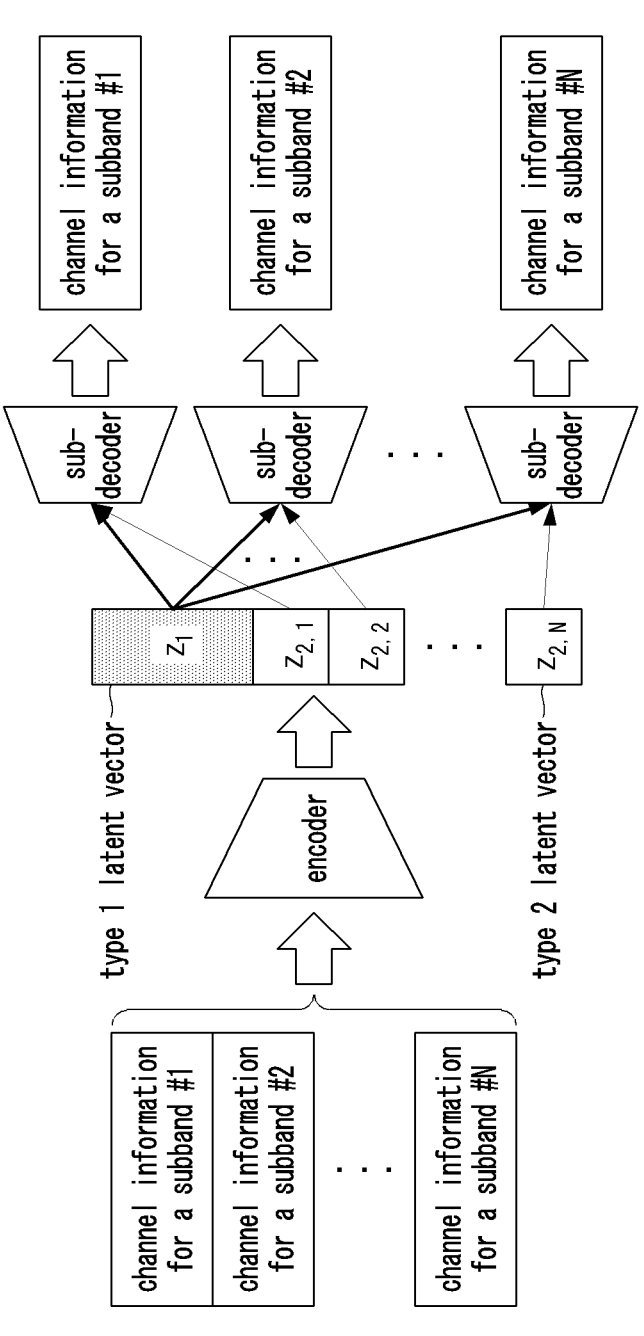
FIG. 4 is a conceptual diagram illustrating a second exemplary embodiment of a channel state information feedback method in a communication system.

FIG. 4 is a conceptual diagram illustrating a second exemplary embodiment of a channel state information feedback method in a communication system.

Referring to FIG. 4, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station.

Accordingly, the base station may use an artificial neural network-based decoder to restore the CSI into channel information for a plurality of resource regions. As described above, the CSI feedback device may include the encoder and the decoder. The encoder and decoder may form an auto-encoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

In particular, the encoder may receive channel information for M resource regions as input, and compress them into latent vectors. The decoder may receive a portion or all of the latent vectors for N resource regions as input and reconstruct per-resource region channel information. Here, the decoder may use distinct partitions of the latent vectors as input. In the decoder, each partition may be trained to reconstruct channel information for each different resource region. In this case, each partition of the latent vectors may be trained as per-resource region CSI. As a result, channel states for the respective resource regions may form distinguishable structured CSI.

In this case, the encoder may simply partition the entire latent vectors by the number of resource regions. In addition, the decoder may be trained to restore per-resource region channel information by using each partition as input. In this case, the latent vectors may fail to learn common elements between resource regions. As a result, compression efficiency for channel information may be reduced. For example, the above-exemplified method may expect compression efficiency similar to compressing and reconstructing channel information by applying an encoder and decoder on a resource region basis.

Accordingly, in order to overcome the above-described problem, the present disclosure allows the encoder to receive channel information for M resource regions as input and compress them into latent vectors. In addition, the decoder may receive a portion or all of the latent vectors for N resource regions as input, and reconstruct per-resource region channel information. In this case, the latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be defined as n=1, 2, . . . , or N. N may be a positive integer.

Here, the type 1 latent vector may be interpreted as common CSI for all N resource regions, and the n-th type 2 latent vector may be interpreted as CSI specific to the n-th resource region. In other words, when the decoder wants to reconstruct channel information for the n-th resource region, the decoder may use not only the CSI for the n-th resource region but also the common CSI as inputs. According to the proposed method of the present disclosure, compression efficiency for channel information can be achieved with the type 1 latent vector, and structurization of the CSI can be achieved with the type 2 latent vectors.

Here, the M resource regions and N resource regions may be the same. That is, M and N may be the same. In this case, the encoder may receive channel information for N sub-bands as input and compress them into latent vectors. In addition, the decoder may receive a portion or all of the latent vectors as input and reconstruct per-resource region channel information. The latent vectors in the latent space may be partitioned into one type 1 latent vector and N type 2 latent vectors. The decoder may reconstruct channel information for the n-th subband by receiving the type 1 latent vector and the n-th type 2 latent vector as input. Here, the type 1 latent vector may be interpreted as common CSI for all N subbands. The n-th type 2 latent vector may be interpreted into CSI for the n-th subband.

Figure 5:
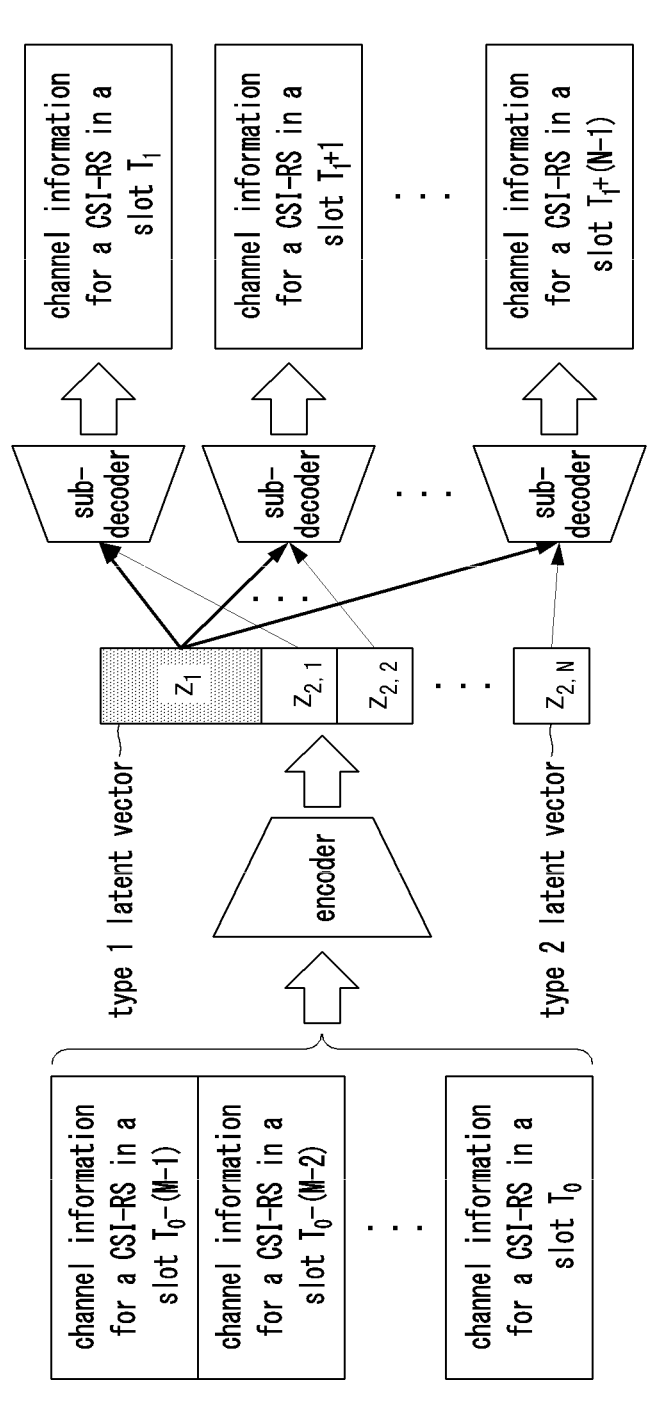
FIG. 5 is a conceptual diagram illustrating a third exemplary embodiment of a channel state information feedback method in a communication system.

FIG. 5 is a conceptual diagram illustrating a third exemplary embodiment of a channel state information feedback method in a communication system.

Referring to FIG. 5, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

In particular, the encoder may receive channel information for M resource regions as input, and compress them into latent vectors. The decoder may receive a portion or all of the latent vectors for N resource regions as input and reconstruct per-resource region channel information. Here, the decoder may use distinct partitions of the latent vectors as input. In the decoder, each partition may be trained to reconstruct channel information for each different resource region. In this case, each partition of the latent vectors may be trained as per-resource region CSI. As a result, channel states for the respective resource regions may form distinguishable structured CSI.

Here, the M resource regions and N resource regions may be distinguished from each other. That is, M and N may be different. As an example, the encoder may receive channel information for M (e.g. M=5) CSI-reference signal (CSI-RS) resource regions (or time resources) of a past time point as input, and compresses them into latent vectors. The decoder may receive a portion or all of the latent vectors as input, and reconstruct per-resource region channel information for N (e.g. N=3) CSI-RS resource regions (or time resources) of a future time point. Here, the latent vectors in the latent space may be partitioned into one type 1 latent vector and N type 2 latent vectors. The decoder may receive the type 1 latent vector and the n-th type 2 latent vector as input and reconstruct the channel information for the n-th CSI-RS resource region (or time resource).

Here, the type 1 latent vector may be interpreted as common CSI for all N CSI-RS resource regions (or time resources) of a future time point. The n-th type 2 latent vector may be interpreted as CSI for the n-th CSI-RS resource region (or time resource). The terminal may partition the type 1 latent vector and the type 2 latent vectors, and then feedback the type 1 latent vector and/or the type 2 latent vectors to the base station.

Meanwhile, $\{T_0-(M-1), T_0-(M-2), \ldots, \text{ and } T_0\}$ may refer to the previous M consecutive slots based on a past time point $T_0$. $\{T_1, T_{1+1}, \text{ to, } T_1+(N-1)\}$ may refer to N consecutive slots based on a time point $T_1$. That is, the encoder may compress channel information measured with CSI-RS resources in the past M slots, and the decoder may predict channel information for the N future slots.

Meanwhile, the present disclosure may configure artificial neural network-based encoder and decoder to obtain CSI in a mobile communication system consisting of a base station and one or more terminals. The encoder may receive channel information for M resource regions as input and compress them into latent vectors. The decoder may receive a portion or all of the latent vectors as input, and reconstruct per-resource region channel information for N resource regions. In this case, the resource region may be defined in one or more of the following schemes.

(1) Scheme 1: Subband
 (2) Scheme 2: Time period
 (3) Scheme 3: Time and frequency resource region The M resource regions and N resource regions may be the same resource regions. That is, M and N may be the same. Alternatively, the M resource regions and N resource regions may be distinct resource regions. That is, M and N may not be the same. In case of distinct resource regions, for example, the M resource regions may be resource regions corresponding to a past time point, and the N resource regions distinct from the M resource regions may be resource regions corresponding to a future time point. In addition, a (lower) artificial neural network of the decoder that reconstructs per-resource region channel information may have different weights for the respective resource regions. Alternatively, the lower artificial neural network of the decoder that reconstructs per-resource region channel information may have the same weights for a plurality of resource regions.

Figure 6A:
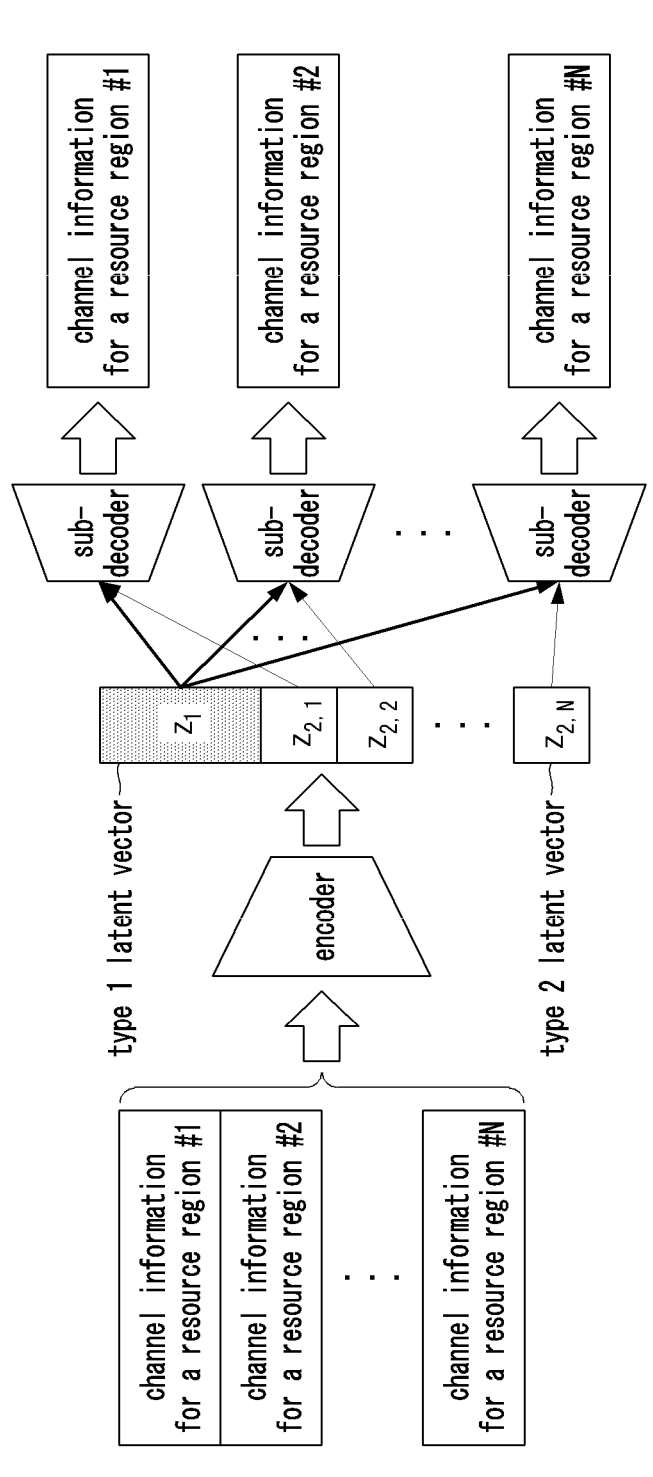
FIGS. 6A and 6B are conceptual diagrams illustrating a fourth exemplary embodiment of a channel state information feedback method in a communication system.
Figure 6B:
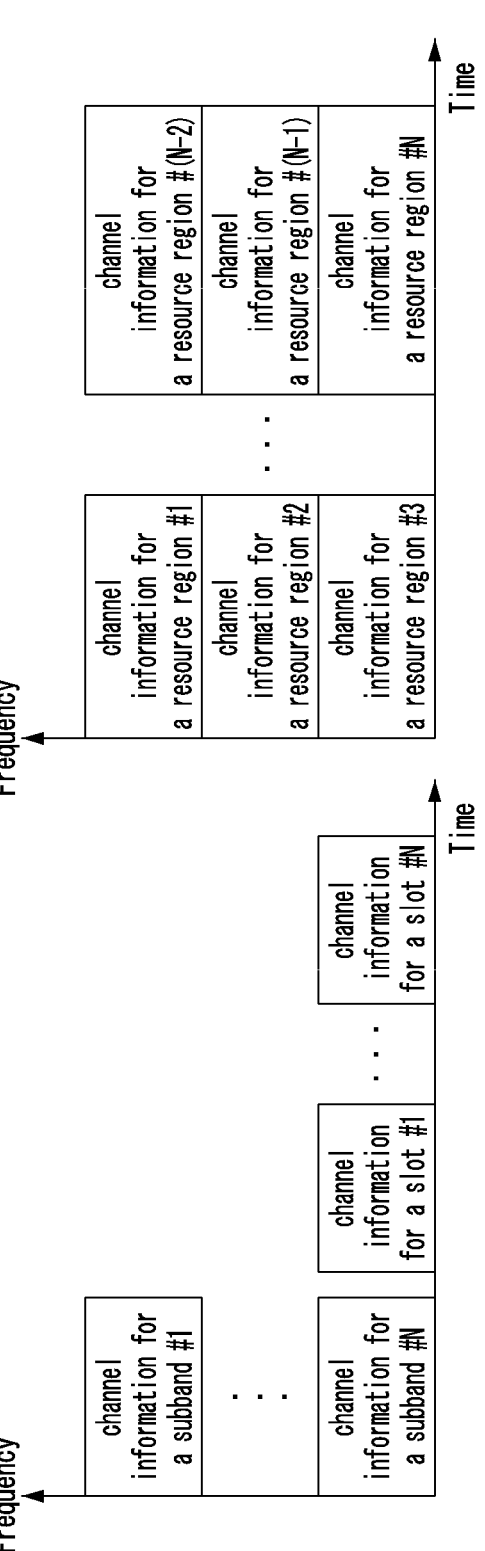

Each of the M or N resource regions may be configured with the same size in the time and frequency domains. For example, the M or N resource regions may mean M or N subbands of the same size, M or N time periods of the same size, or M or N time and frequency resource regions of the same size. Here, the time period may mean a transmission time interval (TTI). FIGS. 6A and 6B are conceptual diagrams illustrating a fourth exemplary embodiment of a channel state information feedback method in a communication system.

Referring to FIGS. 6A and 6B, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive channel information for M resource regions as input, and compress them into latent vectors. The decoder may receive a portion or all of the latent vectors for N resource regions as input and reconstruct per-resource region channel information. In this case, the latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be defined as n=1, 2, ..., or N. N may be a positive integer. Here, the type 1 latent vector may be interpreted as common CSI for all N resource regions, and the n-th type 2 latent vector may be interpreted as CSI specific to the n-th resource region Here, the N (or M) resource regions may be defined in various forms. For example, when channel information is expressed in the frequency domain, N (or M) resource regions may correspond to N (or M) subbands. In this case, eigen vector information of a channel for each subband for N (or M) subbands may correspond to channel information. The type 1 latent vector may refer to common CSI for subbands, and the type 2 latent vector may refer to CSI for each subband (i.e. per-subband CSI).

As another example, when channel information is collected over several slots in the time domain, N (or M) resource regions may correspond to N (or M) time periods (slots). In this case, eigen vector information of a channel of each time period (slot) for N (or M) time period (slots) may correspond to channel information. The type 1 latent vector may mean common CSI for time periods (slots), and the type 2 latent vector may mean CSI for each time period (slot).

Finally, when the time and frequency domain is divided into N (or M) resource regions, the N (or M) resource regions may correspond to N (or M) time and frequency resource regions. In this case, eigen vector information of a channel of each resource region for N (or M) time and frequency resource regions may correspond to channel information. The type 1 latent vector may mean common CSI for N (or M) time and frequency resource regions.

The type 2 latent vector may mean CSI for each time and frequency resource region. Here, each of N (or M) resource regions may be configured to have the same size in the time and frequency domain. For example, N (or M) resource regions may mean N (or M) subbands of the same size, N (or M) time periods of the same size, or N (or M) time and frequency resource regions of the same size. In addition, the time period may mean a TTI.

Meanwhile, the present disclosure may configure artificial neural network-based encoder and decoder to obtain CSI in a mobile communication system consisting of a base station and one or more terminals. The encoder may receive channel information for M resource regions as input and compress them into latent vectors. The decoder may receive a portion or all of the latent vectors as input, and reconstruct per-resource region channel information for N resource regions. Here, the decoder may train an artificial neural network to minimize a sum of reconstruction losses for channel information for the respective resource regions.

The M resource regions and N resource regions may be the same resource regions. That is, M and N may be the same. Alternatively, the M resource regions and N resource regions may be distinct resource regions. That is, M and N may not be the same. In case of distinct resource regions, for example, the M resource regions may be resource regions corresponding to a past time point, and the N resource regions distinct from the M resource regions may be resource regions corresponding to a future time point. In addition, a (lower) artificial neural network of the decoder that reconstructs per-resource region channel information may have different weights for the respective resource regions. Alternatively, the lower artificial neural network of the decoder that reconstructs per-resource region channel information may have the same weights for a plurality of resource regions. In this case, the decoder may have a decoder artificial neural network structure that receives information for all subbands and restores information for all subbands.

Figure 7:
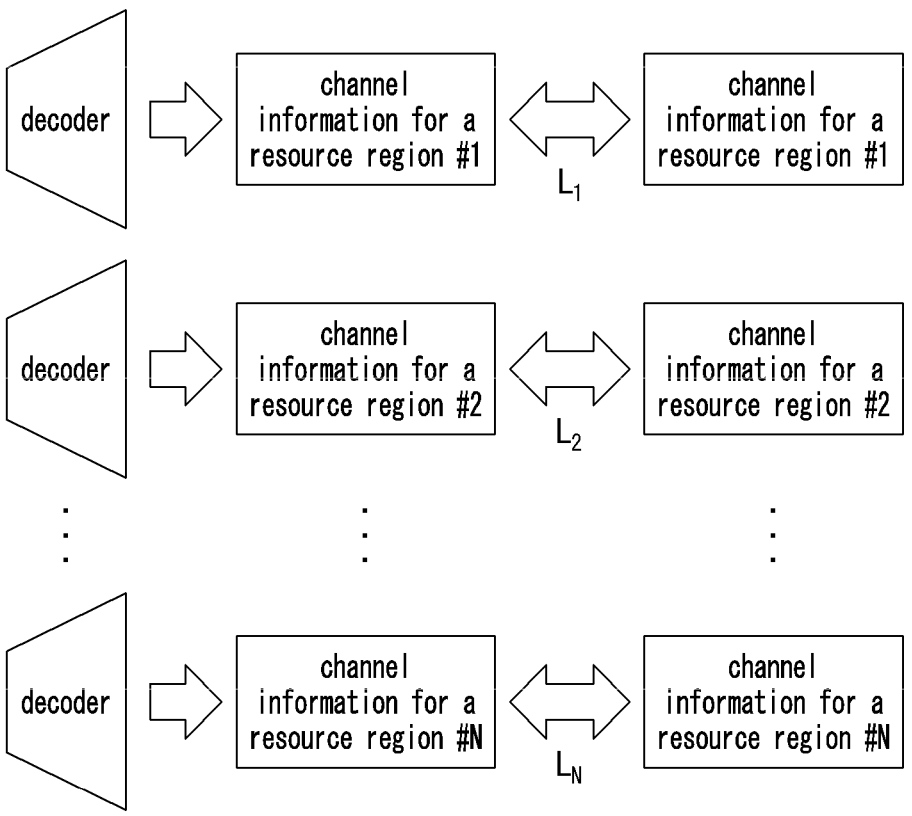
FIG. 7 is a conceptual diagram illustrating a first exemplary embodiment of a loss function calculation method in a channel state information feedback device.

FIG. 7 is a conceptual diagram illustrating a first exemplary embodiment of a loss function calculation method in a channel state information feedback device.

Referring to FIG. 7, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive channel information for M resource regions as input, and compress them into latent vectors. In addition, the decoder may receive a portion or all of the latent vectors for N resource regions as input and reconstruct per-resource region channel information. In this case, the latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be n=1, 2, . . . , or N. N may be a positive integer. Here, the type 1 latent vector may be interpreted as common CSI for all N resource regions, and the n-th type 2 latent vector may be interpreted as CSI specific to the n-th resource region.

Here, the decoder may reconstruct channel information for each n-th resource region for all N resource regions. Accordingly, the decoder may calculate a reconstruction loss for per-resource region channel information. The final purpose of configuring the artificial neural network-based encoder and decoder to obtain CSI may be to reconstruct channel information for all N resource regions. Accordingly, the encoder and decoder may train the artificial neural networks to minimize reconstruction losses for channel information for all N resource regions. Therefore, in the present disclosure, the encoder and/or decoder may obtain a reconstruction loss of channel information for the entire resource regions by summing the reconstruction losses for channel information derived for the respective resource regions for the entire resource region. Then, the encoder and/or decoder may train the artificial neural networks in a way to minimize the reconstruction loss.

Here, the artificial neural network constituting the decoder may all have the same weights for the resource regions. In addition, the decoder may have weights differentiated for each resource region. For example, a loss function for each resource region may be configured as a mean square error (MSE) function, or the like. In this case, a channel reconstruction loss for each resource region may be $L_i$ to $L_N$. The overall loss function $L_T$ for artificial neural network training may be calculated using Equation 1.

$$L_T = \sum_{n=0}^{n=N} L_n \qquad \text{[Equation 1]}$$

Meanwhile, as a variation of the proposed method, the decoder may assign weight(s) to channel reconstruction loss(es) for specific resource region(s). In this case, the decoder may calculate a weighted sum to derive the overall loss function.

Meanwhile, the present disclosure may configure artificial neural network-based encoder and decoder to obtain CSI in a mobile communication system consisting of a base station and one or more terminals. The encoder may receive channel information for M resource regions as input, and compress them into latent vectors. The decoder may receive a portion or all of the latent vectors as input and reconstruct per-resource region channel information for N resource regions. Here, the encoder and/or decoder may augment training data by permuting the order of channel information for N resource regions.

Describing it in more detail, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive channel information for M resource regions as input, and compress them into latent vectors. In addition, the decoder may receive a portion or all of the latent vectors for N resource regions as input and reconstruct per-resource region channel information. In this case, the latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be n=1, 2, . . . , or N. N may be a positive integer. Here, the type 1 latent vector may be interpreted as common CSI for all N resource regions, and the n-th type 2 latent vector may be interpreted as CSI specific to the n-th resource region.

In this case, the type 1 latent vector may mean common information for N resource regions. Accordingly, the type 1 latent vector may be trained so as not to be affected by the order of channel information for N resource regions. Additionally, the latent vector for the k-th order may mean CSI for the resource region input in the k-th order (e.g. the n-th resource region). The decoder may receive the type 1 latent vector and the k-th type 2 latent vector for the resource region input in the k-th order (e.g. the n-th resource region) as input, and may reconstruct channel information for the resource region input in the k-th order (e.g. the n-th resource region). Accordingly, the application order of the decoder may vary for N resource regions. However, the decoder operation may not change for each resource region. Therefore, unlike the conventional auto-encoder scheme, the artificial neural network-based CSI feedback encoding/decoding scheme proposed by the present disclosure may be robust to permutation of the order of channel information for N resource regions. The artificial neural network-based CSI feedback encoding/decoding scheme proposed by the present disclosure may augment training data by permuting the order of channel information for N resource regions.

Meanwhile, the present disclosure may configure artificial neural network-based encoder and decoder to obtain CSI in a mobile communication system consisting of a base station and one or more terminals. The encoder may compress channel information for a plurality of time and/or frequency resource regions into CSI. The CSI may be classified into common CSI for a plurality of resource regions and per-resource region CSI. The base station and/or the terminal may share information on a partition structure of the latent vectors as information on the artificial neural networks for CSI. The information on the partition structure of the latent vectors may include one or more of the following information.

(1) Whether the latent vectors are structured or not
(2) The number of partitions of the latent vectors
(3) The size of each partition of the latent vectors
(4) Partition(s) of the latent vectors, which correspond to common CSI
(5) Partition(s) of the latent vectors, which correspond to per-resource region CSI
(6) The number of feedback bits or the size of a payload for common CSI
(7) The number of feedback bits or the size of a payload for per-resource region CSI
(8) Information on the size of a resource region corresponding to per-resource region CSI The number of partitions of the latent vectors and/or information on the size of each partition may be classified into information for a region of the latent vector corresponding to common CSI and a region of the latent vectors corresponding to per-resource region CSI. The terminal may report information on supportable latent vector structure(s) to the base station by including it in terminal capability information when reporting the terminal capability. Here, the base station may configure the terminal to apply a specific latent vector structure among the latent vector structure(s) supportable by the terminal.

Figure 8:
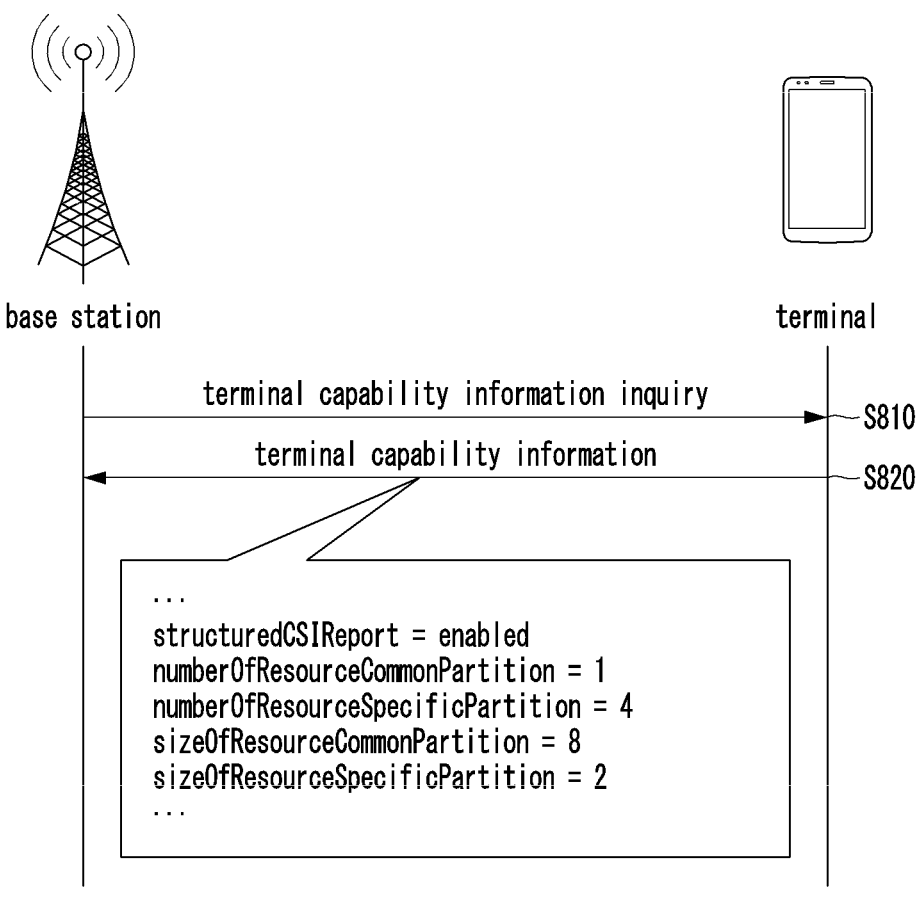
FIG. 8 is a sequence chart illustrating a first exemplary embodiment of a method for sharing structural information for latent vectors in a channel state information feedback device.

FIG. 8 is a sequence chart illustrating a first exemplary embodiment of a method for sharing structural information for latent vectors in a channel state information feedback device.

Referring to FIG. 8, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions.

As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive channel information for M resource regions as input, and compress them into latent vectors. In addition, the decoder may receive a portion or all of the latent vectors for N resource regions as input and reconstruct per-resource region channel information. In this case, the latent vectors in the latent space may be divided into one type 1 latent vector and N type 2 latent vectors. The decoder may reconstruct channel information for the n-th resource region by receiving the type 1 latent vector and the n-th type 2 latent vector as input. Here, n may be n=1, 2, ..., or N. N may be a positive integer. Here, the type 1 latent vector may be interpreted as common CSI for all N resource regions, and the n-th type 2 latent vector may be interpreted as CSI specific to the n-th resource region.

In order to construct artificial neural networks for such the structured CSI feedback, the base station and/or the terminal may recognize information on the structurization of CSI in advance. The present disclosure proposes a method of utilizing artificial neural network-based encoder and decoder to obtain CSI in accordance therewith. In this case, the encoder may compress channel information for a plurality of time and/or frequency resource regions into CSI. The channel state information may be classified into common CSI for a plurality of resource regions and per-resource region CSI. The base station and/or the terminal may share information on a partition structure of latent vectors as information on the artificial neural networks for CSI.

For example, information on the partition structure of latent vectors may include one or more of the following information.

(1) Whether the latent vectors are structured or not (i.e. whether to use structured channel state information)

(2) The number of partitions of the latent vectors (3) The size of each partition of the latent vectors (4) Partition(s) of the latent vectors, which correspond to common CSI (5) Partition(s) of the latent vectors, which correspond to per-resource region CSI (6) The number of feedback bits or the size of a payload for common CSI (7) The number of feedback bits or the size of a payload for per-resource region CSI (8) Information on the size of a resource region corresponding to per-resource region CSI Specifically, the base station may transmit a terminal capability information inquiry message to the terminal requesting terminal capability information (S810). Then, the terminal may receive the terminal capability information inquiry message from the base station. Then, the terminal may include information on structurization of latent vectors in terminal capability information, and report it to the base station or network (S820). That is, the terminal may report the terminal capability information to the base station or network by including information that the terminal supports structured CSI in the terminal capability information. Then, the base station may receive information on the structurization of latent vectors, which is included in the terminal capability information, from the terminal. That is, the base station may receive the terminal capability information from the terminal including the information that the terminal supports structured CSI. Accordingly, the base station may configure whether or not to support structured CSI based on the terminal capability information to the terminal through a higher layer signal such as radio resource control (RRC) signaling.

Meanwhile, a structured CSI reporting parameter included in the terminal capability information may indicate whether the latent vectors are structured. For example, the structured CSI reporting parameter may be structuredC-SIReport. Enabling of the structured CSI reporting parameter may mean structurization of the latent vectors. In addition, the number of common resource partitions included in the terminal capability information may mean the number of partition(s) of the latent vectors, which correspond to the common CSI. For example, the number of common resource partitions may be memberOfResource-CommonPartition. For example, the number of common resource partitions may be 1. The number of specific resource partitions included in the terminal capability information may mean the number of partitions of the latent vectors, which correspond to per-resource region CSI. For example, the number of specific resource partitions may be memberOfResourceSpecificPartition. For example, the number of specific resource partitions may be 4. In addition, a common resource partition size included in the terminal capability information may mean the size of the partition of the latent vectors corresponding to the common CSI. For example, the common resource partition size may be sizeOf-ResourceCommonPartition. For example, the common resource partition size may be 8. In addition, a specific resource partition size included in the terminal capability information may mean the size of the partition of the latent vectors corresponding to the per-resource region CSI. For example, the specific resource partition size may be sizeOf-ResourceSpecificPartition. For example, the specific resource partition size may be 2. Here, the partition size is expressed as the number of vector elements, but may also be expressed as the number of bits.

Meanwhile, the present disclosure may configure artificial neural network-based encoder and decoder to obtain CSI in a mobile communication system consisting of a base station and one or more terminals. The encoder may compress channel information for a plurality of time and/or frequency resource regions into CSI. The CSI may be classified into common CSI for a plurality of resource regions and per-resource region CSI. The terminal may report the common CSI and per-resource region CSI for some selected resource regions to the base station. In this case, the terminal may additionally report location information of the selected resource regions to the base station. In addition, the location information of the selected resource regions may be coded separately from the per-resource region CSI for the selected resource regions. The decoder may be an artificial neural network trained to reconstruct channel information for the entire resource regions by taking the per-resource region CSI for the selected resource regions as input.

Figure 9:
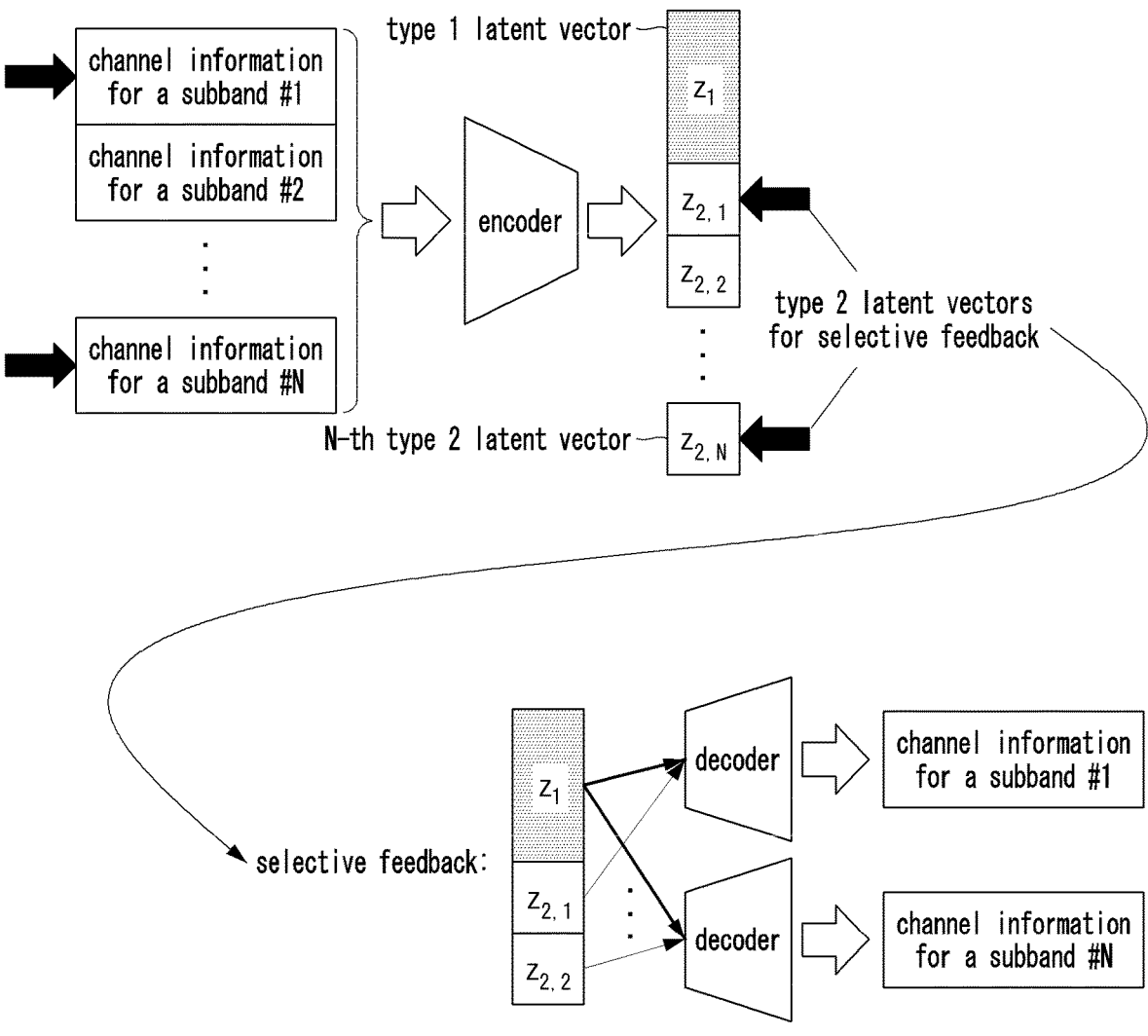
FIG. 9 is a conceptual diagram illustrating a first exemplary embodiment of a selective channel state information feedback method in a channel state information feedback device.

FIG. 9 is a conceptual diagram illustrating a first exemplary embodiment of a selective channel state information feedback method in a channel state information feedback device.

Referring to FIG. 9, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive channel information for M resource regions as input, and compress them into latent vectors. In addition, the decoder may receive a portion or all of the latent vectors for N resource regions as input and reconstruct per-resource region channel information. In this case, the latent vectors in the latent space may be partitioned into one type 1 latent vector and N type 2 latent vectors. The decoder may reconstruct channel information for the n-th resource region by receiving the type 1 latent vector and the n-th type 2 latent vector as input. Here, n may be $n=1, 2, \ldots,$ or N. N may be a positive integer. Here, the type 1 latent vector may be interpreted as common CSI for all N resource regions, and the n-th type 2 latent vector may be interpreted as CSI specific to the n-th resource region.

As described above, the artificial neural network may learn the structured CSI, and classify the CSI into common CSI and per-resource region CSI for a plurality of resource regions. The encoder may perform adaptive CSI feedback by utilizing the structured characteristics of the CSI. For example, the amount of variations in channels for N resource regions may be different for each resource region. Accordingly, as a form of the adaptive channel state information feedback technique, the terminal may feedback CSI only for some resource region with a large channel variation amount among N resource regions to the base station. That is, the terminal may determine priorities of N pieces of CSI and feedback R pieces of CSI with high priorities to the base station. Here, R may be a positive integer. In FIG. 9, R may be 2. As a result, the terminal may reduce the overall CSI feedback load.

In this case, the decoder may be an artificial neural network trained to reconstruct channel information for the entire resource regions by using per-resource region CSI for some selected resource regions as input. In this case, channel information for the entire resource regions can be restored while reducing the feedback load. Accordingly, the present disclosure provides a method of utilizing artificial neural network-based encoder and decoder to obtain CSI.

In this case, the encoder may compress channel information for a plurality of time and/or frequency resource regions into CSI. Here, the CSI may be classified into common CSI for a plurality of resource regions and per-resource region CSI. The terminal may report common CSI for a plurality of resource regions and per-resource region CSI for some selected resource regions to the base station. The terminal may additionally report location information of the resource regions for the per-resource region CSI to the base station. The location information may be coded separately from the per-resource region CSI for the selected resource regions.

Meanwhile, the present disclosure may configure artificial neural network-based encoder and decoder to obtain CSI in a mobile communication system consisting of a base station and one or more terminals. The encoder may compress channel information for a plurality of time and/or frequency resource regions into CSI. The CSI may be classified into common CSI for a plurality of resource regions and per-resource region CSI.

In this case, channel information for an unobserved resource region set (i.e. future resource region set) may be constructed by combining CSIs predicted for respective unobserved resource regions, which are calculated applying a regression function to common CSI obtained for an observed resource region set and per-resource region CSI for the observed resource region set. In this case, the process of obtaining the channel information for the unobserved resource region set may be performed at the terminal or base station. When performed at the terminal, the terminal may feedback the predicted CSI for the unobserved resource region set to the base station. The terminal may omit common CSI.

Figure 10:
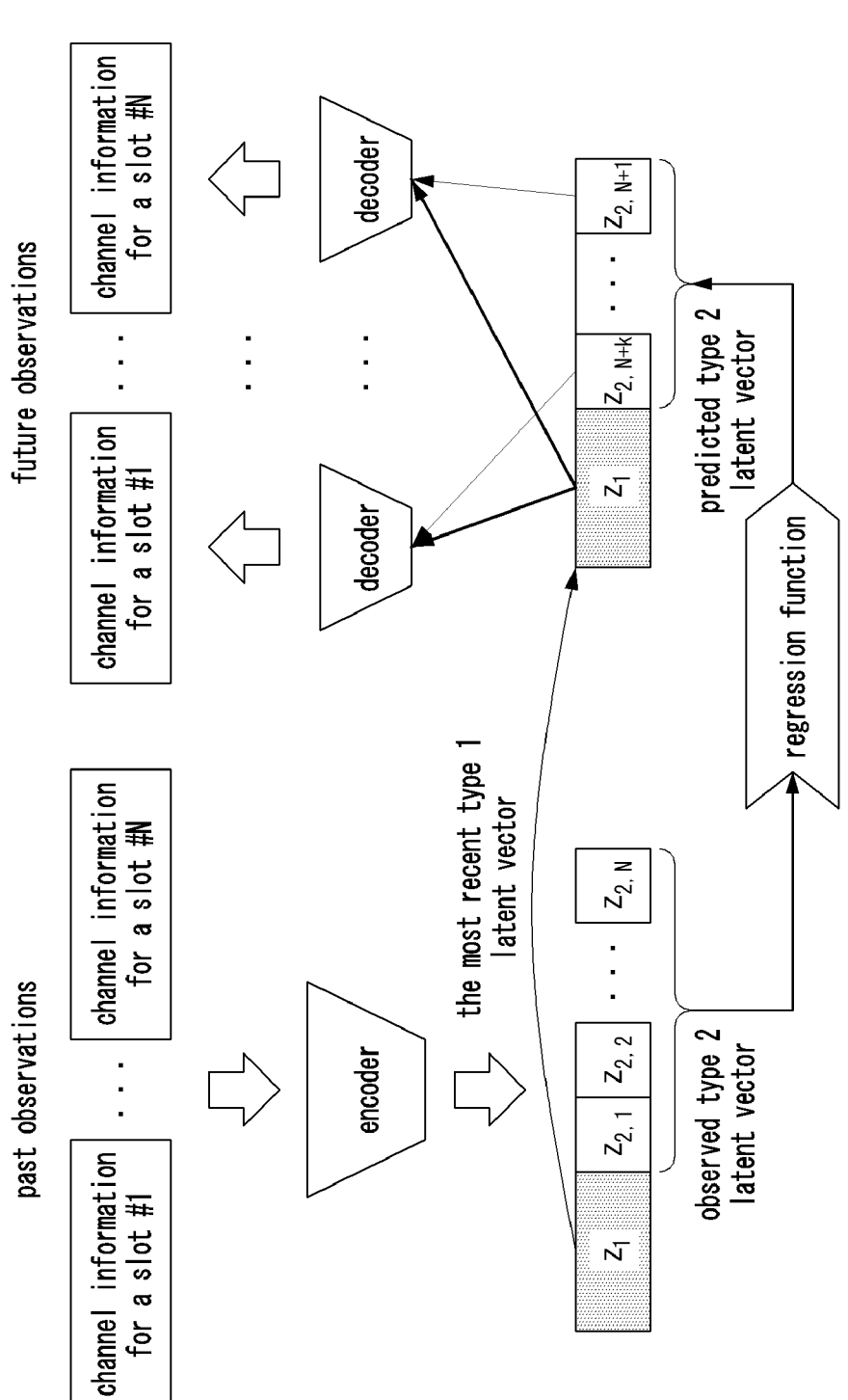
FIG. 10 is conceptual diagrams illustrating a fifth exemplary embodiment of a channel state information feedback method in a communication system.

FIG. 10 is conceptual diagrams illustrating a fifth exemplary embodiment of a channel state information feedback method in a communication system.

Referring to FIG. 10, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based encoder to compress channel information for a plurality of resource regions into CSI and report it to the base station. Accordingly, the base station may use an artificial neural network-based decoder to restore the CSI into channel information for a plurality of resource regions. As described above, the CSI feedback device may include the encoder and the decoder. The encoder and decoder may form an autoencoder. The encoder may be located in the terminal, and the decoder may be located in the base station. Such the autoencoder may perform data compression (or dimensionality reduction) by setting the number of neurons in a hidden layer between the encoder and decoder to be less than that of an input layer. Such the autoencoder may be constructed based on a CNN. Here, the encoder may be referred to as a channel compression artificial neural network.

The encoder may receive past channel information for N resource regions as input and compress them into latent vectors. In addition, the base station may receive a portion or all of the past latent vectors for the N resource regions as input and apply a regression function to reconstruct a future latent vector for each of the K resource regions. Here, N and K may be positive integers. In this case, the latent vectors in the latent space may be partitioned into one type 1 latent vector and N type 2 latent vectors. Here, the type 2 latent vectors may be the past latent vectors. In the above-described manner, the base station may receive the type 1 latent vector and the type 2 latent vectors as input and apply a regression function to generate predicted type 2 latent vectors related to future channel information. The decoder may reconstruct the future channel information using the type 1 latent vector and the predicted type 2 latent vectors. Here, the type 1 latent vector may be interpreted as common CSI for all N resource regions. As described above, the decoder may reconstruct the future channel information for the resource regions by receiving the type 1 latent vector and the predicted type 2 latent vectors as input.

In contrast, the terminal may predict per-resource region CSI for an unobserved resource region by utilizing the structured characteristics of the CSI. For example, M may be the same as N, and the M resource regions at the encoder may be the same as the N resource regions at the decoder. The N resource regions may correspond to N time periods (slots).

In this case, the encoder may store common CSI for the past N resource regions and predict per-resource region CSI for the future N resource regions. The common CSI may be information maintained during a plurality of time periods and may have properties of long-term channel information. In contrast, since per-resource region CSI has fewer dimensions than the entire CSI, it may be predicted with a regression model using a relatively simple regression function. Thereafter, the encoder may construct predicted CSI for a future time point by combining the common CSI for the past resource regions and per-resource region CSI predicted for future resource regions. The decoder may use these as input to calculate channel information for the future time point.

Accordingly, the present disclosure proposes a method of utilizing artificial neural network-based encoder and decoder to obtain CSI. The encoder may compress channel information for a plurality of time and/or frequency resource regions into CSI. Here, the CSI may be classified into common CSI for a plurality of resource regions and per-resource region CSI.

The encoder may configure CSI for an unobserved resource region set by combining per-resource regions CSIs predicted by applying a regression function to common CSI obtained for an observed resource region set and per-resource region CSIs for the observed resource region set. Then, the encoder may transmit the predicted CSI for the unobserved resource region set to the base station. Then, the base station may receive the predicted CSI from the terminal. Accordingly, the base station may obtain channel information for the unobserved resource region set by decoding the predicted CSI for the unobserved resource region set through the decoder. Here, the terminal may feedback the predicted CSI for the unobserved resource region set. At this time, the terminal may exclude common CSI from the feedback target. That is, the terminal may feedback only the predicted per-resource region CSI to the base station. In this case, the base station may configure the predicted CSI for the unobserved resource region by combining the most recently received common CSI and the predicted per-resource region CSIs. In addition, the base station may obtain channel information for the unobserved resource region set by decoding the predicted CSI for the unobserved resource region through the decoder.

Meanwhile, the present disclosure may configure artificial neural network-based encoder and decoder to obtain CSI in a mobile communication system consisting of a base station and one or more terminals. A first artificial neural network may compress channel information for a plurality of time and/or frequency resource regions into CSI. The CSI may be classified into common CSI for a plurality of resource regions and per-resource region CSI. A second artificial neural network may be trained to receive the common CSI and channel information for some resource region(s) output from the first artificial neural network as input, and reconstruct channel information for some specific resource region(s).

In this case, a CSI feedback device may be applied to a mobile communication system consisting of a base station and a terminal, such as the 5G NR communication system according to the 3GPP specifications. The base station and terminal constituting the CSI feedback device may utilize artificial neural networks to obtain CSI by compressing channel information. In particular, when the terminal feeds back CSI to the base station, the terminal may utilize an artificial neural network-based first encoder to compress channel information for a plurality of resource regions into CSI and report it to the base station.

Accordingly, the base station may use an artificial neural network-based first decoder to restore the CSI into channel information for a plurality of resource regions. As described above, the CSI feedback device may include the first encoder and the second decoder. The first encoder and first decoder may form an autoencoder. The first encoder may be located in the terminal, and the first decoder may be located in the base station. Such the autoencoder may perform data compression (or dimensionality reduction) by setting the number of neurons in a hidden layer between the first encoder and first decoder to be less than that of an input layer. Such the autoencoder may be constructed based on a CNN. Here, the first encoder may be referred to as a channel compression artificial neural network.

As described above, the first encoder may compress channel information into CSI. Here, the first encoder may separate and compress common CSI for a plurality of resource regions and per-resource region CSI. Here, the common CSI is average CSI and may not have a relatively large change over time. In contrast, the per-resource region CSI is instantaneous CSI, and may have a relatively large change over time.

Therefore, the terminal may feedback the CSI to the base station. In this case, the terminal may report the common CSI to the base station at a long periodicity. In contrast, the terminal may report the per-resource region CSI to the base station at a short periodicity. As a result, the feedback load may be efficient.

In this case, in order to effectively utilize the common CSI, the decoder may utilize an artificial neural network for using the common CSI reported in the past and channel information for some newly measured specific resource regions as input to reconstruct channel information for the some specific resource region(s). Therefore, the present disclosure may utilize the artificial neural network-based encoder and decoder to obtain CSI in a mobile communication system consisting of a base station and one or more terminals.

Here, the first artificial neural network may compress channel information for a plurality of time and/or frequency resource regions into CSI. The CSI may be classified into common CSI for a plurality of resource regions and per-resource region CSI. The second artificial neural network may be trained to receive the common CSI and channel information for some specific resource region(s) output from the first artificial neural network as input and to reconstruct channel information for the some specific resource region(s).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:
receiving a reference signal from a base station;
generating a first latent vector based on the reference signal by using an artificial neural network, the first latent vector being common channel state information (CSI) for M resource regions, and M being a positive integer;
generating a second latent vector based on the reference signal by using the artificial neural network, the second latent vector being per-resource region CSI for each of the M resource regions; and
transmitting structured CSI including the first latent vector and the second latent vectors to the base station.

2. The method according to claim 1, wherein each of the M resource region is at least one of a CSI-reference signal (CSI-RS) resource region, a subband, a time period, or a time and frequency resource region.

3. The method according to claim 1, further comprising, before receiving the reference signal from the base station, receiving information on a partition structure of latent vectors from the base station, wherein the structured CSI is generated based on the received information on the partition structure of latent vectors.

4. The method according to claim 3, wherein the information on the partition structure of latent vectors includes at least one of information on whether the latent vectors are structured, information on a number of partitions of the latent vectors, information on a size of each partition of the latent vectors, information on partition(s) of the latent vectors corresponding to the common CSI, information on partition(s) of the latent vectors corresponding to the per-resource region CSI, information on a number of feedback bits for the common CSI, information on a feedback payload size for the common CSI, information on a number of feedback bits for the per-resource region CSI, or information on a feedback payload size for the per-resource region CSI.

5. The method according to claim 1, further comprising:
receiving a terminal capability inquiry signal from the base station regarding whether to support the structured CSI; and
transmitting terminal capability information including information on whether to support the structured CSI to the base station.

6. The method according to claim 5, wherein the terminal capability information includes at least one of information on whether to support the structured CSI, information on a number of partitions of the first latent vector, information on a size of each partition of the first latent vector, information on a number of partitions of the second latent vectors, or information on a size of for each partition of the second latent vectors.

7. The method according to claim 1, further comprising transmitting location information of the M resource regions to the base station.

8. The method according to claim 1, further comprising:
generating predicted per-resource region CSI for each of unobserved resource regions by applying a regression model to per-resource region CSI for each of the M resource regions; and
transmitting predicted second latent vectors, which are the predicted per-resource region CSIs for the unobserved resource regions, to the base station.

9. A method of a base station, comprising:
transmitting a reference signal to a terminal;
receiving, from the terminal, structured channel state information (CSI) including a first latent vector and second latent vectors based on the reference signal;
generating common CSI for resource regions by restoring the first latent vector through an artificial neural network;
generating per-resource region CSI for each of the resource regions by restoring the second latent vectors through the artificial neural network; and
constructing channel information for each of the resource regions using the common CSI and the per-resource region CSI.

10. The method according to claim 9, wherein each of the resource region is at least one of a CSI-reference signal (CSI-RS) resource region, a subband, a time period, or a time and frequency resource region.

11. The method according to claim 9, further comprising, before transmitting the reference signal to the terminal, transmitting information on a partition structure of latent vectors to the terminal, wherein the first latent vector and the second latent vectors are generated based on the partition structure of latent vectors.

12. The method according to claim 11, wherein the information on the partition structure of latent vectors includes at least one of information on whether the latent vectors are structured, information on a number of partitions of the latent vectors, information on a size of each partition of the latent vectors, information on partition(s) of the latent vectors corresponding to the common CSI, information on partition(s) of the latent vectors corresponding to the per-resource region CSI, information on a number of feedback bits for the common CSI, information on a feedback payload size for the common CSI, information on a number of feedback bits for the per-resource region CSI, or information on a feedback payload size for the per-resource region CSI.

13. The method according to claim 9, further comprising:

transmitting a terminal capability inquiry signal to the terminal regarding whether to support the structured CSI; and receiving terminal capability information including information on whether to support the structured CSI from the terminal.

14. The method according to claim 13, wherein the terminal capability information includes at least one of information on whether to support the structured CSI, information on a number of partitions of the first latent vector, information on a size of each partition of the first latent vector, information on a number of partitions of the second latent vectors, or information on a size of for each partition of the second latent vectors.

15. The method according to claim 9, further comprising:

generating predicted second latent vectors for unobserved resource regions by applying a regression function to the second latent vectors;

generating predicted per-resource region CSIs for the unobserved resource regions by combining the first latent vector and the predicted second latent vectors; and generating channel information for the unobserved resource regions from the predicted per-resource region CSIs.

16. The method according to claim 9, further comprising:

calculating a reconstruction loss of channel information for each of the resource regions;

calculating a reconstruction loss of channel information for entire resource regions by summing reconstruction losses of channel information for the respective resource regions; and training an artificial neural network to minimize the reconstruction loss of channel information for the entire resource regions.

17. A terminal comprising a processor, wherein the processor causes the terminal to perform:

receiving a reference signal from a base station;

generating a first latent vector based on the reference signal by using an artificial neural network, the first latent vector being common channel state information (CSI) for M resource regions, and M being a positive integer;

generating a second latent vector based on the reference signal by using the artificial neural network, the second latent vector being per-resource region CSI for each of the M resource regions; and transmitting structured CSI including the first latent vector and the second latent vectors to the base station.

18. The terminal according to claim 17, wherein each of the M resource region is at least one of a CSI-reference signal (CSI-RS) resource region, a subband, a time period, or a time and frequency resource region.

19. The terminal according to claim 17, wherein the processor further causes the terminal to perform:

receiving a terminal capability inquiry signal from the base station regarding whether to support the structured CSI; and transmitting terminal capability information including information on whether to support the structured CSI to the base station.

20. The terminal according to claim 17, wherein the processor further causes the terminal to perform:

generating predicted per-resource region CSI for each of unobserved resource regions by applying a regression model to per-resource region CSI for each of the M resource regions; and transmitting predicted second latent vectors, which are the predicted per-resource region CSIs for the unobserved resource regions, to the base station.

* * * * *